United States Patent
Achanta et al.

(10) Patent No.: US 9,319,100 B2
(45) Date of Patent: Apr. 19, 2016

(54) DELAY COMPENSATION FOR VARIABLE CABLE LENGTH

(71) Applicant: Schweitzer Engineering Laboratories, Inc., Pullman, WA (US)

(72) Inventors: Srinivas Achanta, Pullman, WA (US); Hidayatullah Ahsan, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 122 days.

(21) Appl. No.: 13/964,786

(22) Filed: Aug. 12, 2013

(65) Prior Publication Data

US 2015/0043697 A1 Feb. 12, 2015

(51) Int. Cl.
| | |
|---|---|
| *H04L 7/00* | (2006.01) |
| *H04L 25/00* | (2006.01) |
| *H04L 25/40* | (2006.01) |
| *H04B 3/04* | (2006.01) |
| *H04J 3/06* | (2006.01) |
| *H02J 13/00* | (2006.01) |

(52) U.S. Cl.
CPC ............ *H04B 3/04* (2013.01); *H04J 3/0638* (2013.01); *H02J 13/00* (2013.01); *H04J 3/065* (2013.01); *H04J 3/0667* (2013.01); *H04J 3/0697* (2013.01)

(58) Field of Classification Search
CPC ....... H04L 7/0041; H04B 3/04; H04J 3/0638; H04J 3/065; H04J 3/0667; H04J 3/069; H02J 13/00
USPC ........................................................ 375/371
See application file for complete search history.

(56) References Cited

U.S. PATENT DOCUMENTS

| | | | | |
|---|---|---|---|---|
| 5,160,926 A | * | 11/1992 | Schweitzer, III | ........ 340/870.02 |
| 5,557,284 A | * | 9/1996 | Hartman | .................. 342/357.29 |
| 5,737,715 A | | 4/1998 | Deaton | |
| 6,144,334 A | | 11/2000 | Claffey | |

(Continued)

FOREIGN PATENT DOCUMENTS

| | | |
|---|---|---|
| WO | 9747987 | 12/1997 |
| WO | 2012151006 | 11/2012 |
| WO | 2014005016 | 1/2014 |

OTHER PUBLICATIONS

PCT/US2013/058297, Patent Cooperation Treaty, International Search Report and Written Opinion of the International Searching Authority, Feb. 14, 2014.

(Continued)

*Primary Examiner* — Nader Bolourchi
(74) *Attorney, Agent, or Firm* — Stoel Rives LLP; Richard M. Edge

(57) ABSTRACT

The present application discloses a time distribution device capable of providing a synchronized time signal to a plurality of end devices connected to the time distribution device with cables of various lengths. The time distribution device may receive a time signal, generate a time reference based on the received time signal, compensate the time reference for hardware delay, and overcompensate the time reference for a delay caused by a maximum cable length. Prior to being distributed to various end devices, each being connected with the time distribution device by cables of varying length, this overcompensated time reference may then be delayed by an amount based on the cable length connecting each respective end device such that the arrival of each of the synchronized time references at the various end devices is synchronized.

18 Claims, 7 Drawing Sheets

(56) References Cited

U.S. PATENT DOCUMENTS

| | | | |
|---|---|---|---|
| 6,229,479 B1 | 5/2001 | Kozlov | |
| 6,483,856 B1 | 11/2002 | Bird | |
| 7,146,516 B2 | 12/2006 | Dhupar | |
| 7,375,683 B2 | 5/2008 | Smith | |
| 7,398,411 B2 | 7/2008 | Zweigle | |
| 7,436,232 B2 | 10/2008 | Sivero | |
| 7,440,427 B1 | 10/2008 | Katz | |
| 7,940,213 B2 | 5/2011 | Harper | |
| 7,952,519 B1 | 5/2011 | Nielsen | |
| 7,978,130 B1 | 7/2011 | Cohen | |
| 7,979,228 B2 | 7/2011 | Zurbuchen | |
| 8,055,288 B2 | 11/2011 | Ladd | |
| 8,138,972 B2 | 3/2012 | Underbrink | |
| 8,159,391 B2 | 4/2012 | Papadimitratos | |
| 8,237,609 B2 | 8/2012 | Talbot | |
| 8,325,087 B2 | 12/2012 | Thomson | |
| 8,326,319 B2* | 12/2012 | Davis | H04W 56/006 455/404.2 |
| 8,446,896 B2 | 5/2013 | Bedrosian | |
| 8,564,330 B1 | 10/2013 | Radulov | |
| 8,655,608 B2* | 2/2014 | Guzman-Casillas | 702/58 |
| 9,083,503 B2 | 7/2015 | Sagen | |
| 2002/0158693 A1 | 10/2002 | Soong | |
| 2003/0087654 A1 | 5/2003 | Wheeler | |
| 2003/0107513 A1 | 6/2003 | Abraham | |
| 2004/0062279 A1 | 4/2004 | Primrose | |
| 2004/0166879 A1 | 8/2004 | Meadows | |
| 2004/0228368 A1 | 11/2004 | Jecmen | |
| 2006/0259806 A1* | 11/2006 | Zweigle et al. | 713/400 |
| 2007/0132773 A1 | 6/2007 | Plante | |
| 2007/0194987 A1 | 8/2007 | Fedora | |
| 2008/0169978 A1 | 7/2008 | Powell | |
| 2008/0186229 A1 | 8/2008 | Van Diggelen | |
| 2008/0198069 A1 | 8/2008 | Gronemeyer | |
| 2009/0117928 A1 | 5/2009 | Ladd | |
| 2009/0160705 A1 | 6/2009 | Matsuzaki | |
| 2009/0315764 A1 | 12/2009 | Cohen | |
| 2010/0030916 A1 | 2/2010 | Greenwood Graham | |
| 2010/0034190 A1 | 2/2010 | Yun | |
| 2010/0073228 A1 | 3/2010 | Smith | |
| 2010/0117899 A1 | 5/2010 | Papadimitratos | |
| 2010/0190509 A1 | 7/2010 | Davis | |
| 2010/0222068 A1 | 9/2010 | Gaal | |
| 2010/0231448 A1 | 9/2010 | Harper | |
| 2010/0253578 A1 | 10/2010 | Mantovani | |
| 2010/0254225 A1 | 10/2010 | Schweitzer, III | |
| 2011/0001668 A1 | 1/2011 | Cobb | |
| 2011/0035066 A1* | 2/2011 | Schweitzer et al. | 700/286 |
| 2011/0068973 A1 | 3/2011 | Humphreys | |
| 2011/0085540 A1 | 4/2011 | Kuwabara | |
| 2011/0102258 A1 | 5/2011 | Underbrink | |
| 2011/0102259 A1 | 5/2011 | Ledvina | |
| 2011/0169577 A1 | 7/2011 | Nicholls | |
| 2011/0181466 A1 | 7/2011 | Serrano | |
| 2011/0227787 A1 | 9/2011 | Gum | |
| 2011/0261917 A1 | 10/2011 | Bedrosian | |
| 2011/0285586 A1 | 11/2011 | Ferguson | |
| 2011/0287779 A1 | 11/2011 | Harper | |
| 2012/0005326 A1 | 1/2012 | Bradetich | |
| 2012/0026037 A1 | 2/2012 | Thomson | |
| 2012/0030495 A1 | 2/2012 | Chandhoke | |
| 2012/0066418 A1 | 3/2012 | Foster | |
| 2012/0116677 A1 | 5/2012 | Higgison | |
| 2012/0179404 A1 | 7/2012 | Lee | |
| 2012/0182181 A1 | 7/2012 | Dai | |
| 2012/0195253 A1 | 8/2012 | Irvine | |
| 2012/0195350 A1 | 8/2012 | Das | |
| 2012/0323397 A1 | 12/2012 | Schweitzer, III | |
| 2013/0157593 A1 | 6/2013 | Achanta | |
| 2013/0244624 A1 | 9/2013 | Das | |
| 2013/0328606 A1 | 12/2013 | Ravi | |
| 2013/0335266 A1* | 12/2013 | Vollath et al. | 342/357.25 |
| 2014/0003199 A1* | 1/2014 | Dougan et al. | 368/46 |
| 2014/0094218 A1 | 4/2014 | Hammes | |
| 2014/0100702 A1 | 4/2014 | Schweitzer | |
| 2014/0111377 A1 | 4/2014 | Achanta | |
| 2014/0250972 A1 | 9/2014 | Achanta | |
| 2014/0327574 A1 | 11/2014 | Achanta | |
| 2014/0334477 A1 | 11/2014 | Stahlin | |

OTHER PUBLICATIONS

PCT/US2013/065695, Patent Cooperation Treaty, International Search Report and Written Opinion of the International Searching Authority, Mar. 10, 2014.

PCT/US2013/065447, Patent Cooperation Treaty, International Search Report and Written Opinion of the International Searching Authority, Mar. 13, 2014.

Shepard, D., Humphreys, T., Fansler, A., "Evaluation of the Vulnerability of Phasor Measurement Units to GPS Spoofing Attacks", Oct. 2, 2011.

PCT/US2014/010422 Patent Cooperation Treaty, International Search Report and Written Opinion of the International Searching Authority, Sep. 16, 2014.

PCT/US2014/034358 Patent Cooperation Treaty, International Search Report and Written Opinion of the International Searching Authority, Sep. 22, 2014.

PCT/US2013/064942 Patent Cooperation Treaty, International Search Report and Written Opinion of the International Searching Authority, Jan. 29, 2014.

Tippenhauer, N.O., Popper, C., Rasmussen, K.B., Capkun, S., On the Requirements for Successful GPS Spoofing Attacks, In Proceedings of the ACM Conference on Computer and Communications Security (CCS), Oct. 2011.

Moore, P., Crossley, P., GPS Applications in Power Systems Part 1 Introduction to GPS, Tutorial: GPS in Power Systems, Power Engineering Journal, Feb. 1999.

Jafarnia-Jahromi, A., Broumandan, A., Nielsen, J., Lachapelle, G., "GPS Vulnerability to Spoofing Threats and a Review of Antispoofing Techniques", International Journal of Navigation and Observation vol. 2012, Article ID 127072, Feb. 2012.

Wullems, C., "A Spoofing Detection Method for Civilian L1 GPS and the E1-B Galileo Safety of Life Service". IEEE Transactions on Aerospace and Electronic Systems, Aug. 2011.

Wen, H., Huang, P. Y., Dyer, J., Archinal, A., Fagan, J., "Countermeasures for GPS Signal Spoofing," Proceedings of the 18th International Technical Meeting of the Satellite Division of The Institute of Navigation (ION GNSS 2005), Long Beach, CA, Sep. 2005, pp. 1285-1290.

Gurtner, W., Estey, L., "Rinex: The Receiver Independent Exchange Format Version 3.00", Nov. 28, 2007.

Gurtner, W., "Rinex: The Receiver Independent Exchange Format Version 2", Sep. 2008.

PCT/US2013/064012, Patent Cooperation Treaty, International Search Report and Written Opinion of the International Searching Authority, Dec. 19, 2013.

PCT/US2014/010507 Patent Cooperation Treaty, International Search Report and Written Opinion of the International Searching Authority, May 6, 2014.

PCT/US2015/029939 Patent Cooperation Treaty, International Search Report and Written Opinion of the International Searching Authority, Aug. 12, 2015.

PCT/US2014/049813 Patent Cooperation Treaty, International Search Report and Written Opinion of the International Searching Authority, Apr. 2, 2015.

PCT/US2015/024000 Patent Cooperation Treaty, International Search Report and Written Opinion of the International Searching Authority, Jul. 13, 2015.

PCT/US2015/054144 Patent Cooperation Treaty, International Search Report and Written Opinion of the International Searching Authority, Jan. 4, 2016.

* cited by examiner

DELAY COMPENSATION FOR VARIABLE CABLE LENGTH

TECHNICAL FIELD

This disclosure relates to a time distribution device capable of providing a synchronized time signal to a plurality of end devices connected to the time distribution device with cables of various lengths. More particularly, this disclosure relates to receiving a time reference from a global navigational satellite system (GNSS) or other time source, compensating the time signal for system delays, including delays caused by variable cable lengths, and distributing a synchronized time signal to a plurality of end devices.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
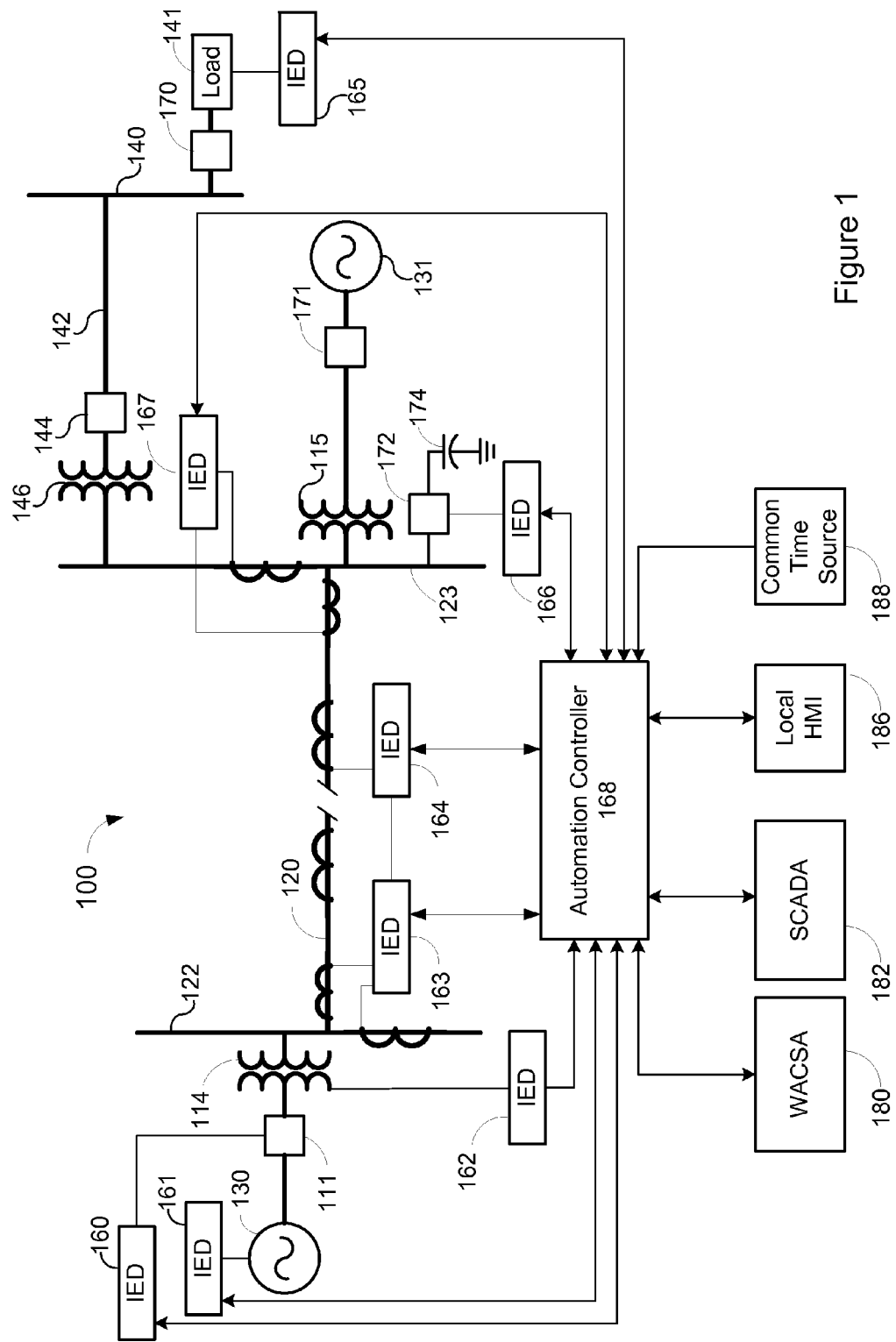
FIG. 1 illustrates a simplified one-line diagram of an electric power delivery system.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be illustrated as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of non-transitory machine-readable media suitable for storing electronic instructions.

FIG. 1 illustrates a simplified diagram of an example of an electric power delivery system 100 consistent with embodiments disclosed herein. The systems and methods described herein may be applied and/or implemented in the electric power delivery system 100 illustrated in FIG. 1. Although illustrated as a one-line diagram for purposes of simplicity, an electrical power delivery system 100 may also be configured as a three-phase power system. The electric power delivery system 100 may include electric generators 130 and 131 configured to generate an electrical power output, which in some embodiments may be a sinusoidal waveform.

Generators 130 and 131 may be selectively connected to the electric power delivery system using switches or circuit breakers 111 and 171, respectively. Step-up transformers 114 and 115 may be configured to increase the output of the electric generators 130 and 131 to higher voltage sinusoidal waveforms. Buses 122 and 123 may distribute the higher voltage sinusoidal waveform to a transmission line 120 between buses 122 and 123. Step-down transformer 146 may decrease the voltage of the sinusoidal waveform from bus 123 to a lower voltage suitable for electric power distribution on line 142. Distribution line 142 is further selectively connectable to bus 123 via circuit breaker or switch 144, and may distribute electric power to a distribution bus 140. Load 141 (such as a factory, residential load, motor, or the like) may be selectively connected to distribution bus 140 using switch or circuit breaker 170. It should be noted that additional transformers or other equipment may be used to further step down a voltage from the distribution bus 140 to the load 141.

Various other equipment may be included in the electric power delivery system. Also illustrated is switched capacitor bank (SCB) 174 selectively connectable to transmission bus 123 using circuit breaker or switch 172. Other equipment that may be included in the electric power delivery system may include, for example, static VAR compensators, reactors, load tap changers, voltage regulators, autotransformers, and the like. Some of these are considered as included in the electric power system 100 such as, for example, load tap changers can be considered as part of the load 141. Generators 130 and 131 may be any generator capable of providing electric power to the electric power delivery system and may include, for example, synchronous generators, turbines (such as hydro-electric turbines, wind turbines, gas-fired, coal-fired, and the like), photovoltaic electric generators, tidal generators, wave power generators, and the like. Such generation machines may include components such as power-electronically coupled interfaces, for example, doubly-fed induction machines, direct coupled AC-DC/DC-AC transfer devices, and the like. It should be noted that these are not exhaustive lists, and other equipment, machines, and connected devices may be considered under this disclosure.

Modern electric power delivery systems (which may include electric power generation systems, transmission systems, distribution systems, and consumption systems) are typically controlled using intelligent electronic devices (IEDs). FIG. 1 illustrates several IEDs 160-167 that may be configured to control one or more elements of the electric power delivery system. An IED may be any processor-based device that controls monitored equipment within an electric power delivery system (e.g., system 100). In some embodiments, the IEDs 160-167 may gather equipment status from one or more pieces of monitored equipment (e.g., generator 130). Equipment status may relate to the status of the monitored equipment, and may include, for example, breaker or switch status (e.g., open or closed), valve position, tap position, equipment failure, rotor angle, rotor current, input power, automatic voltage regulator state, motor slip, reactive power control set point, generator exciter settings, and the like. Further, the IEDs 160-167 may receive measurements concerning monitored machines or equipment using sensors, transducers, actuators, and the like. Measurements may relate to a measured status of the machine or equipment, and may include, for example, voltage, current, temperature, pressure, density, infrared absorption, viscosity, speed, rotational velocity, mass, and the like. With the equipment status and/or measurements, IEDs may be configured to derive or calculate derived values, for example, power (real and reactive), magnitudes and angles of voltages and currents, frequency, rate of change of frequency, phasors, synchrophasors, fault distances, differentials, impedances, reactances, symmetrical components, alpha components, Clarke components, alarms, and the like.

According to certain embodiments, IEDs 160-167 may issue control instructions to the monitored equipment in order to control various aspects relating to the monitored equipment. Some examples of actions to control equipment include: opening a breaker which disconnects a generator with a rotor angle moving towards instability; opening a breaker which sheds load that is causing a voltage to decline towards a collapsing condition; opening a breaker to remove an asset when the asset, such as a line or transformer, is exceeding its safe operating limits; opening a breaker which sheds load that is causing the frequency of the system to decline such that it is exceeding predefined operating limits; inserting shunt capacitance with the effect of increasing the voltage on an electric power line so that the reactive requirements on a generator are not exceeded and therefore preemptively preventing the generator from being removed from service by a reactive power control; activating a dynamic brake which counters the acceleration of a machine rotor; adjusting a set-point on a governor to limit the power output of a synchronous machine so that it does not exceed the safe operating limits; simultaneously adjusting set-points of other synchronous machines so that they pick-up the new load; and, adjusting a voltage regulation set-point of an automatic voltage regulator such that a voltage at a more distant point in the power system does not exceed its maximum or minimum voltage threshold; and the like.

An IED (e.g., IED 160) may be in communication with a circuit breaker (e.g., breaker 111), and may be capable of sending an instruction to open and/or close the circuit breaker, thus connecting or disconnecting a portion of a power system. In another example, an IED may be in communication with a recloser and capable of controlling reclosing operations. In another example, an IED may be in communication with a voltage regulator and capable of instructing the voltage regulator to tap up and/or down. Information of the types listed above, or more generally, information or instructions directing an IED or other device or equipment to perform a certain action, may be generally referred to as control instructions.

IEDs 160-167 may be communicatively linked together using a data communications network, and may further be communicatively linked to a central monitoring system, such as a supervisory control and data acquisition (SCADA) system 182, and/or a wide area control and situational awareness (WACSA) system 180. In certain embodiments, various components of the electrical power generation and delivery system 100 illustrated in FIG. 1 may be configured to generate, transmit, and/or receive Generic Object Oriented Substation Events (GOOSE) messages, or communicate using any other suitable communication protocol. For example, an automation controller 168 may communicate certain control instructions to IED 163 via messages using a GOOSE communication protocol.

The example of FIG. 1 is configured in a star topology having an automation controller 168 at its center, however, other topologies are also contemplated. For example, the IEDs 160-167 may be communicatively coupled directly to the SCADA system 182 and/or the WACSA system 180. Certain IEDs, such as IEDs 163 and 164, may be in direct communication with each other to effect, for example, line differential protection of transmission line 120. The data communications network of the system 100 may utilize a variety of network technologies, and may comprise network devices such as modems, routers, firewalls, virtual private network servers, and the like. Further, in some embodiments, the IEDs 160-167 and other network devices (e.g., one or more communication switches or the like) may be communicatively coupled to the communications network through a network communications interface.

Consistent with embodiments disclosed herein, IEDs 160-167 may be communicatively coupled with various points to the electric power delivery system 100. For example, IEDs 163 and 164 may monitor conditions on transmission line 120. IED 160 may be configured to issue control instructions to associated breaker 111. IEDs 163, and 167 may monitor conditions on buses 122, and 123. IED 161 may monitor and issue control instructions to the electric generator 130. IED 162 may monitor and issue control instructions to transformer 114. IED 166 may control operation of breaker 172 to connect or disconnect SCB 174. IED 165 may be in communication with load center 141, and may be configured to meter electric power to the load center. IED 165 may be configured as a voltage regulator control for regulating voltage to the load center using a voltage regulator (not separately illustrated).

In certain embodiments, communication between and/or the operation of various IEDs 160-167 and/or higher level systems (e.g., SCADA system 182 or WACSA 180) may be facilitated by an automation controller 168. The automation controller 168 may also be referred to as a central IED, communication processor, or access controller. In various embodiments, the automation controller 168 may be embodied as the SEL-2020, SEL-2030, SEL-2032, SEL-3332, SEL-3378, or SEL-3530 available from Schweitzer Engineering Laboratories, Inc. of Pullman, Wash., and also as described in U.S. Pat. Nos. 5,680,324, 7,630,863, and U.S. Patent Application Publication No. 2009/0254655, the entireties of which are incorporated herein by reference.

The IEDs 160-167 may communicate a variety of types of information to the automation controller 168 including, but not limited to, operational conditions, status and control information about the individual IEDs 160-167, event (e.g., a fault) reports, communications network information, network security events, and the like. In some embodiments, the automation controller 168 may be directly connected to one or more pieces of monitored equipment (e.g., electric generator 130 or breakers 111, or 172).

The automation controller 168 may also include a local human machine interface (HMI) 186. In some embodiments, the local HMI 186 may be located at the same substation as automation controller 168. The local HMI 186 may be used to change settings, issue control instructions, retrieve an event report (which may originate from a specified IED), retrieve data, and the like. The automation controller 168 may further include a programmable logic controller accessible using the local HMI 186.

The automation controller 168 may also be communicatively coupled to a common time source (e.g., a clock or other time distribution device) 188. In certain embodiments, the automation controller 168 may generate a time signal based on the common time source 188 that may be distributed to communicatively coupled IEDs 160-167. Alternatively, IEDs may be individually connected to a common time source. Based on the time signal, various IEDs 160-167 may be configured to collect and/or calculate time-aligned operational conditions including, for example, synchrophasors, and to implement control instructions in a time coordinated manner. IEDs may use the time information to apply a time stamp to operational conditions and/or communications. In some embodiments, the WACSA system 180 may receive and process the time-aligned data, and may coordinate time synchronized control actions at the highest level of the electrical power generation and delivery system 100. In other embodiments, the automation controller 168 may not receive a time signal, but a common time signal may be distributed to IEDs 160-167.

The common time source 188 may also be used by the automation controller 168 for time stamping information and data. Time synchronization may be helpful for data organization, real-time decision-making, as well as post-event analysis. Time synchronization may further be applied to network communications. The common time source 188 may be any time source that is an acceptable form of time synchronization, including, but not limited to, a voltage controlled temperature compensated crystal oscillator, Rubidium and Cesium oscillators with or without digital phase locked loops, microelectromechanical systems (MEMS) technology, which transfers the resonant circuits from the electronic to the mechanical domains, or a Global Navigational Satellite System (GNSS) such as a Global Positioning System (GPS) receiver with time decoding. In the absence of a discrete common time source 188, the automation controller 168 may serve as the common time source 188 by distributing a time synchronization signal.

Several different GNSS systems (also referred to as GNSS constellations) are available or planned to be available. Some examples of a currently operational GNSS include the United States NAVSTAR Global Positioning System (GPS) system and the Russian GLONASS. Some examples of a GNSS planned for future operation include China's Beidou Navigation Satellite System (BDS), and the European Union's Galileo positioning system. It should be noted that a single GNSS system may include separate constellations (such as, for example, the BDS including a limited test system at a first constellation as well as a system being constructed at a second constellation).

As is detailed above, the electric power delivery system 100 illustrated in FIG. 1 includes local control and protection using IEDs 160-167, and wide-area control using the automation controller 168 and/or WACSA 180 and/or SCADA 182.

Figure 2:
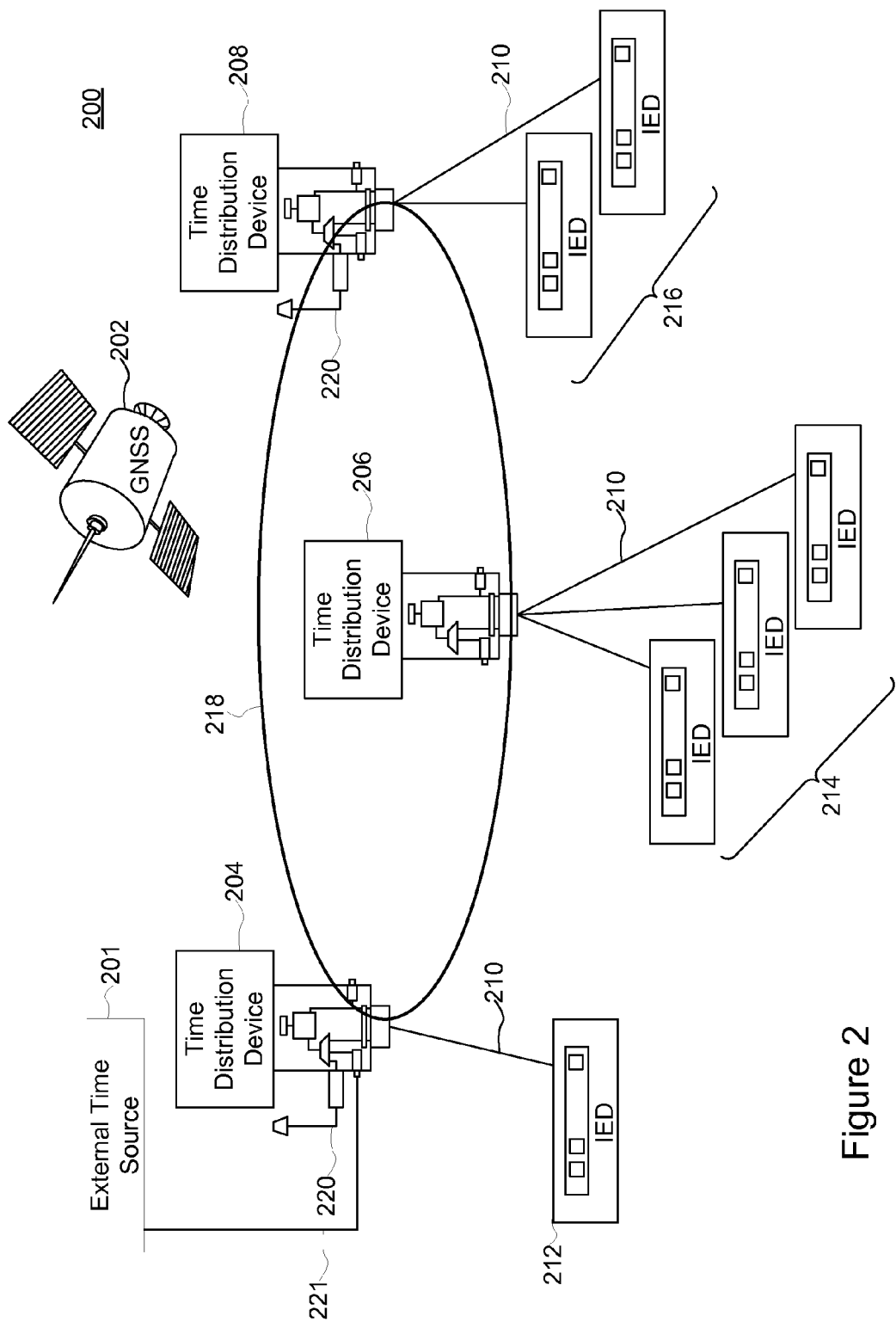
FIG. 2 illustrates an example system of reliable, redundant, and distributed time distribution devices capable of providing a common, synchronized precision time reference.

FIG. 2 illustrates system 200 configured to be a highly reliable, redundant, and distributed system of time distribution devices 204, 206, and 208 capable of providing a common, synchronized precision time reference to various time dependent IEDs 212, 214, and 216, automation controllers 168, or other end devices as described above with respect to FIG. 1. Each time distribution device 204, 206, and 208 may be configured to communicate through multiple protocols and methods. While the system 200 is described as being capable of performing numerous functions and methods, it should be understood that various systems are possible that may have additional or fewer capabilities. Specifically, a system 200 may function as desired using only one protocol, or having fewer external or local time signal inputs.

As illustrated in FIG. 2, three time distribution devices 204, 206, and 208 have wide area network (WAN) capabilities and are communicatively connected to a WAN 218, which may comprise one or more physical connections and protocols. Each time distribution device 204, 206, and 208 may also be connected to one or more IEDs within a local network. For example, time distribution device 204 is connected to IED 212, time distribution device 206 is connected to IEDs 214, and time distribution device 208 is connected to IEDs 216. A time distribution device may be located at, for example, a power generation facility, a distribution hub, a substation, a load center, or other location where one or more IEDs are found. In various embodiments, an IED may include a WAN port, and such an IED may be directly connected to WAN 218. IEDs may be connected via WAN 218 or connection 210. Connection 210 may be, for example, a local area network (LAN) or a dedicated time communication link, such as an Inter-Range Instrumentation Group (IRIG) compliant communication link. In various embodiments, connection 210 may include multiple connections, for example, both a LAN and IRIG connection. Time distribution devices 204, 206, and 208 may establish and maintain a precision time reference among various system components. Each time distribution device 204, 206, and 208 may be configured to communicate time information with IEDs connected on connection 210 through one or more time distribution protocols, such as Institute of Electrical and Electronics Engineers (IEEE) 1588.

Each time distribution device 204, 206, and 208 is configured to receive time signals from a variety of time sources. For example, as illustrated, time distribution device 204 includes an antenna 220 and is configured to receive a GNSS signal from a GNSS repeater or satellite 202. Time distribution device 204 is also configured to receive a second time signal 221 from an external time source 201. The external time source may comprise one or more voltage-controlled temperature-compensated crystal oscillators (VCTCXOs), phase locked loop oscillators, time locked loop oscillators, rubidium oscillators, cesium oscillators, National Institute of Standards and Technology (NIST) broadcasts (e.g., WWV and WWVB), and/or other devices capable of generating precise time signals. In the illustrated embodiment, time distribution devices 204 and 208 include an antenna 220 configured to receive a GNSS signal from the GNSS repeater or satellite 202. As illustrated, time distribution device 206 does not directly receive an external time signal, however, according to alternative embodiments, any number and variety of external time signals may be available to any of the time distribution devices.

According to one embodiment, WAN 218 comprises a synchronous optical network (SONET) configured to embed a synchronized precision time reference in a header or overhead portion of a SONET frame during transmission. Alternatively, a synchronized precision time reference may be conveyed using any number of time communications methods including Inter-range Instrumentation Group (IRIG) protocols, Network Time Protocol (NTP), Simple Network Time Protocol (SNTP), synchronous transport protocols (STP), and/or IEEE 1588 protocols. According to various embodiments, including transmission via SONET, a synchronized precision time reference may be separated and protected from the rest of the WAN network traffic, thus creating a secure time distribution infrastructure. Protocols used for inter IED time synchronization may be proprietary, or based on a standard, such as IEEE 1588 Precision Time Protocol (PTP).

As can be seen, time distribution devices 204, 206, and 208 may receive time signals from, among other sources, one or more GNSS signals. Different time distribution devices may receive time signals from one or more GNSS signal sources that are different from the GNSS signal sources for other time distribution devices. That is, several different GNSS sources are available. The GPS system, for example, consists of around 32 satellites that orbit the Earth twice per sidereal day. Accordingly, several satellites are visible to each receiver at any given time, and different satellites may be visible to different receivers at different times each day.

According to various embodiments, time distribution devices 204, 206, and 208 may be configured to generate time references synchronized to a received time signal. The synchronized time reference may then be distributed to various end devices. However, delay caused by hardware and disparity in cable length between the end devices and the time distribution device may cause the time references to arrive at the end devices at different times, which effectively negates synchronization of the time reference to the time signal. Accordingly, what is needed is a time distribution device configured to compensate for delay caused by hardware and disparity in cable length between the end devices and the time distribution device.

Figure 3:
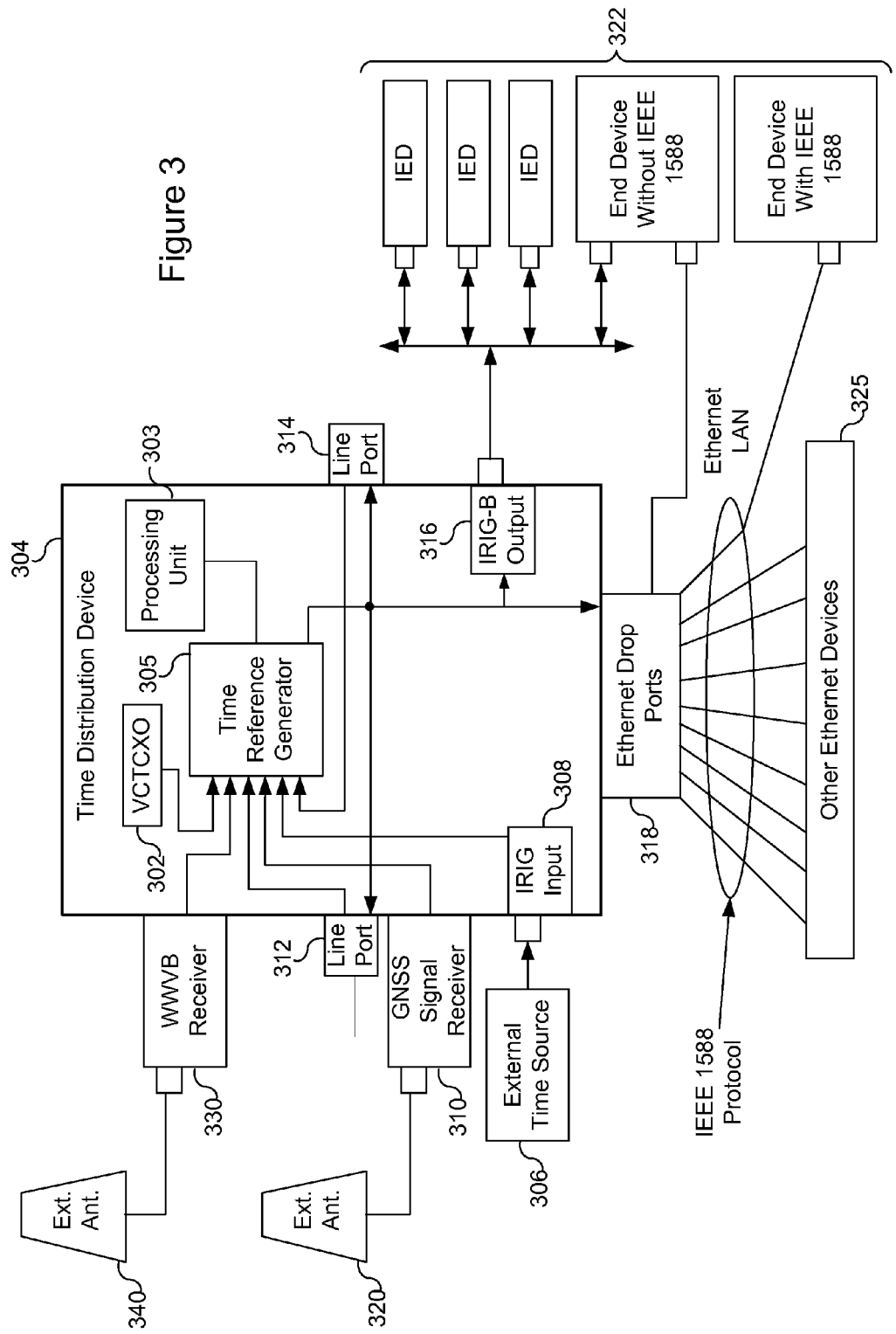
FIG. 3 illustrates a time distribution device for providing a synchronized time reference to one or more end devices

FIG. 3 illustrates a time distribution device 304, according to one embodiment, for providing a synchronized time reference to one or more end devices. In various embodiments, time distribution device 304 may include more or less functionality than the illustration. For example, time distribution device 304 may include an interface for monitoring equipment in an electric power delivery system in certain embodiments. Accordingly, in various embodiments, time distribution device 304 may be implemented either as an IED or as a network device. As illustrated, time distribution device 304 receives time signals from various sources. In various embodiments, the time distribution device 304 may include a local time source 302 such as a voltage-controlled temperature-compensated crystal oscillator (VCTCXO), tempera-ture-compensated crystal oscillator (TCXO), oven-controlled crystal oscillator (OCXO), or the like, that provides a local time signal. Time distribution device 304 may further include a pair of line ports 312 and 314 for communications with a WAN or LAN to receive time signals and distribute a synchronized time reference. Further, time distribution device 304 may include a GNSS signal receiver 310 for receiving a GNSS time signal via GNSS antenna 320. Time distribution device 304 may also include a WWVB receiver 330 for receiving an NIST broadcast, via an external antenna 340, which may include a time signal. The time distribution device 304 may also receive a time signal from an external time source 306 that may be communicated over an IRIG time distribution protocol via input 308. Time distribution device 304 may be equipped to receive time signals from various other time sources and via various other protocols known in the art.

The time distribution device 304 functions to provide a synchronized precision time reference for use by the various end devices connected to the time distribution device 304. For example, the synchronized precision time reference may be communicated from the time distribution device 304 to the end devices 322 and/or 325 using IRIG protocol via the IRIG-B output 316 or IEEE 1588 via Ethernet Drop Ports 318. The Ethernet Drop Ports 318 may also include network communications to the end devices connected to time distribution device 304. In various embodiments, time distribution device 304 may further include connections to SONETs (not shown) and transmit the synchronized precision time reference in a header or overhead portion of SONET frames.

In the example of FIG. 3, time distribution device 304 further includes a processing unit 303 and a synchronized time reference generator 305 for generating a plurality of synchronized time references to be distributed to end devices. As illustrated, the various time signals from the local time source 302, WAN (from line ports 312 and/or 314), GNSS signal receiver 310, WWVB receiver 330, and IRIG input 308 are input into the time reference generator 305 for use in generating the synchronized time reference. In various embodiments, the time distribution device 304 and the various components of the time distribution device may be implemented using a processor in communication with a computer-readable storage medium containing machine executable instructions. In other embodiments, time distribution device 304 and its components may be embodied as hardware, such as an application specific integrated circuit (ASIC), field-programmable gate array (FPGA), or the like, or a combination of hardware and software.

Figure 4:
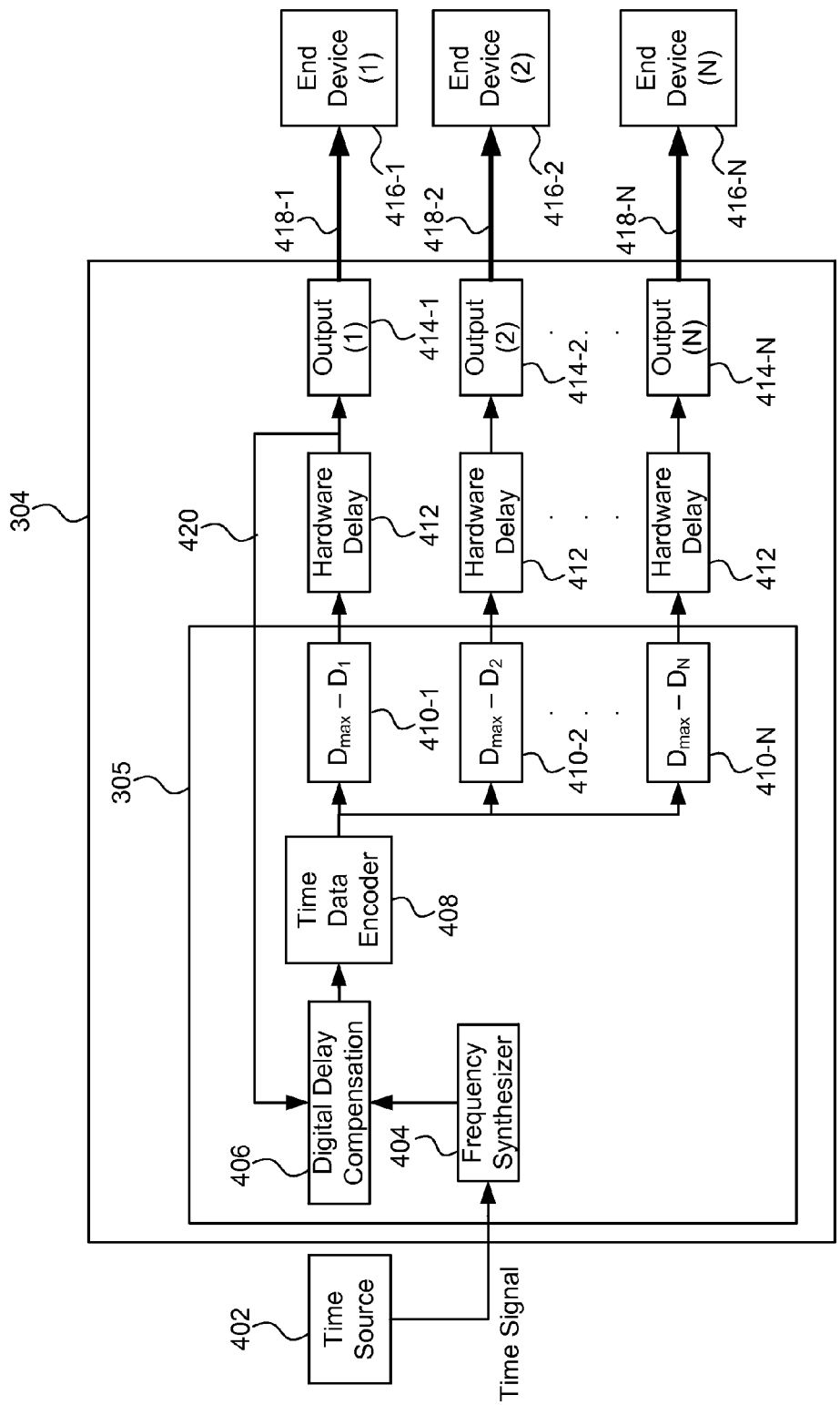
FIG. 4 illustrates a block diagram of a time distribution device including a time reference generator.

FIG. 4 illustrates a block diagram of a time distribution device including a time reference generator. In various embodiments, time distribution device 304 may include a time reference generator 305 as described above with reference to FIG. 3. The time reference generator 305 may be embodied as hardware, such as an application specific integrated circuit (ASIC), field-programmable gate array (FPGA), or the like, or a combination of hardware and software. The time reference generator 305 may include a frequency synthesizer 404, a digital delay compensation component 406, a time data encoder 408, and delay components 410-1-410-N.

The frequency synthesizer 404 may be configured to receive a time signal from time source 402, such as those time sources discussed above. The frequency synthesizer uses the time signal 402 to generate a time reference synchronized to the time signal. For example, the frequency synthesizer 404 may include a phase-locked-loop (PLL) to generate the time reference based on the time signal. In one embodiment, the PLL may be a second order PLL, for example, to help alleviate jitter present in the time signal.

The frequency synthesizer 404 may provide the time reference to a digital delay compensation component 406 where the time reference may be delayed to compensate for delay caused by hardware 412 and cabling 418 between the time distribution device 304 and end devices 416. In one embodiment, the digital delay compensation component 406 may be implemented, for example, as PLL configured to compensate for hardware delay 412 based on feedback 420. To compensate for cabling delay, the digital delay compensation component 406 may overcompensate the time reference based on a maximum cable length. It should be noted that the example embodiment in FIG. 4 includes a single PLL configured to compensate the time reference for each of the multiple outputs to the various end devices 416.

The overcompensated time reference may be provided to time data encoder 408, where time data may be encoded to the time reference for distribution to the various end devices 416. For example, the data encoder 408 may include IRIG-B, pulse-per-second (PPS), kilo pulse-per-second, or similar data on the time reference.

Prior to being distributed to the various end devices 416, a delay is added to the overcompensated time reference by delay components 410. In one embodiment, the delay components 410 may be implemented as registers configured to delay the time reference based on an entered cable length. In one embodiment, the processing unit 303 of the time distribution device 304 calculates the delay based on cable lengths received from a user (e.g., a system administrator) and updates the registers accordingly.

Figure 5:
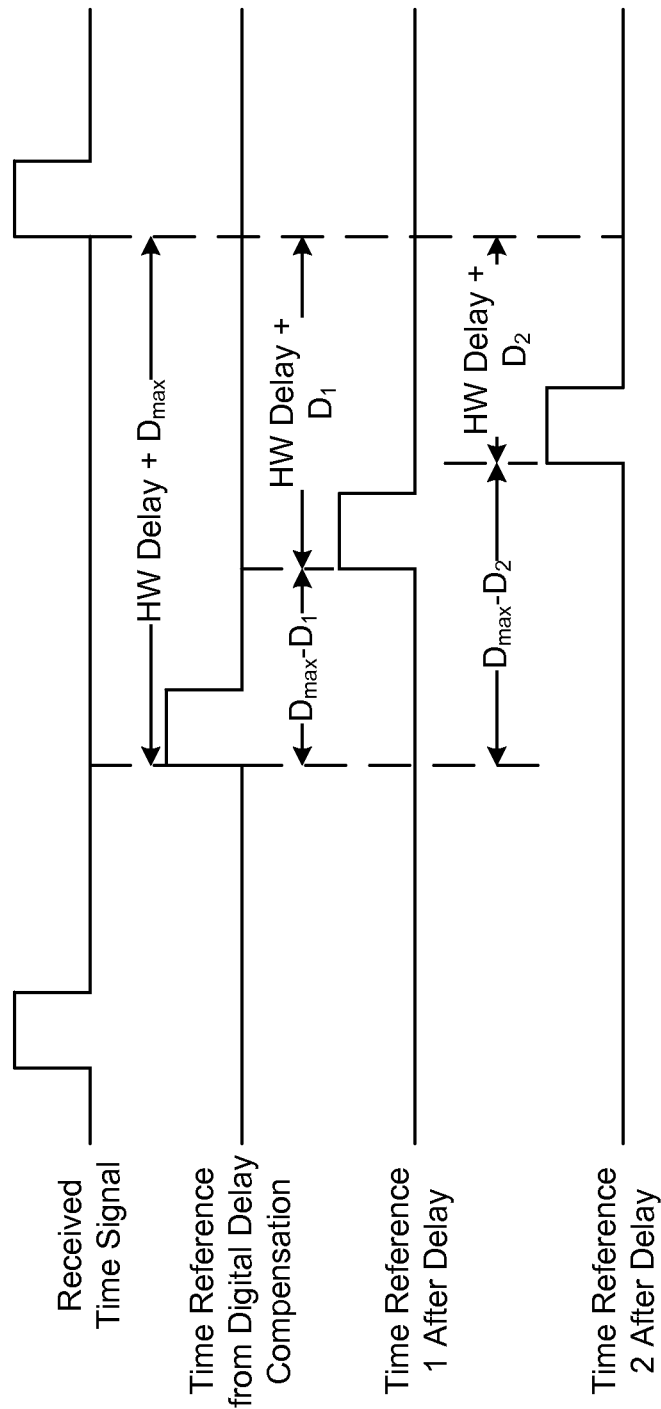
FIG. 5 illustrates a timing diagram depicting a received time signal, a time reference after digital delay compensation, and the time reference at various outputs of the time distribution device.

FIG. 5 illustrates a timing diagram depicting a received time signal, a time reference after digital delay compensation, and the time reference at various outputs of the time distribution device. The first time line of the timing diagram depicts the incoming time signal (e.g., a GPS pulse per second signal or the like). As discussed above, the frequency synthesizer 404 of the time reference generator 305 generates a time reference based on the received time signal.

The second line of the timing diagram depicts an example time reference after the time reference has been processed by the digital delay compensation component 406 of the time reference generator 305. As can be seen in the example timing diagram, the time reference has been compensated to account for hardware delay (HW Delay) and overcompensated to account for delay caused by a maximum cable length ($D_{max}$).

The final two lines of the timing diagram depict the time reference at two separate outputs of the time distribution device 304. Because, in the example of FIG. 5, the end devices served by the two separate outputs are connected with the time distribution device 304 by cables of different lengths, the delay added to each time reference by a delay component 410 is different. The delay component 410 delays the overcompensated signal by an amount based on the cable length connecting an end device to a particular output ($D_1$ and $D_2$). For example the cable connecting a first end device to the time distribution device is longer than the cable connecting a second end device to the time distribution device. This can be seen by the additional delay present in the third line of the timing diagram to account for the longer cable as compared to the fourth line of the timing diagram.

Figure 6:
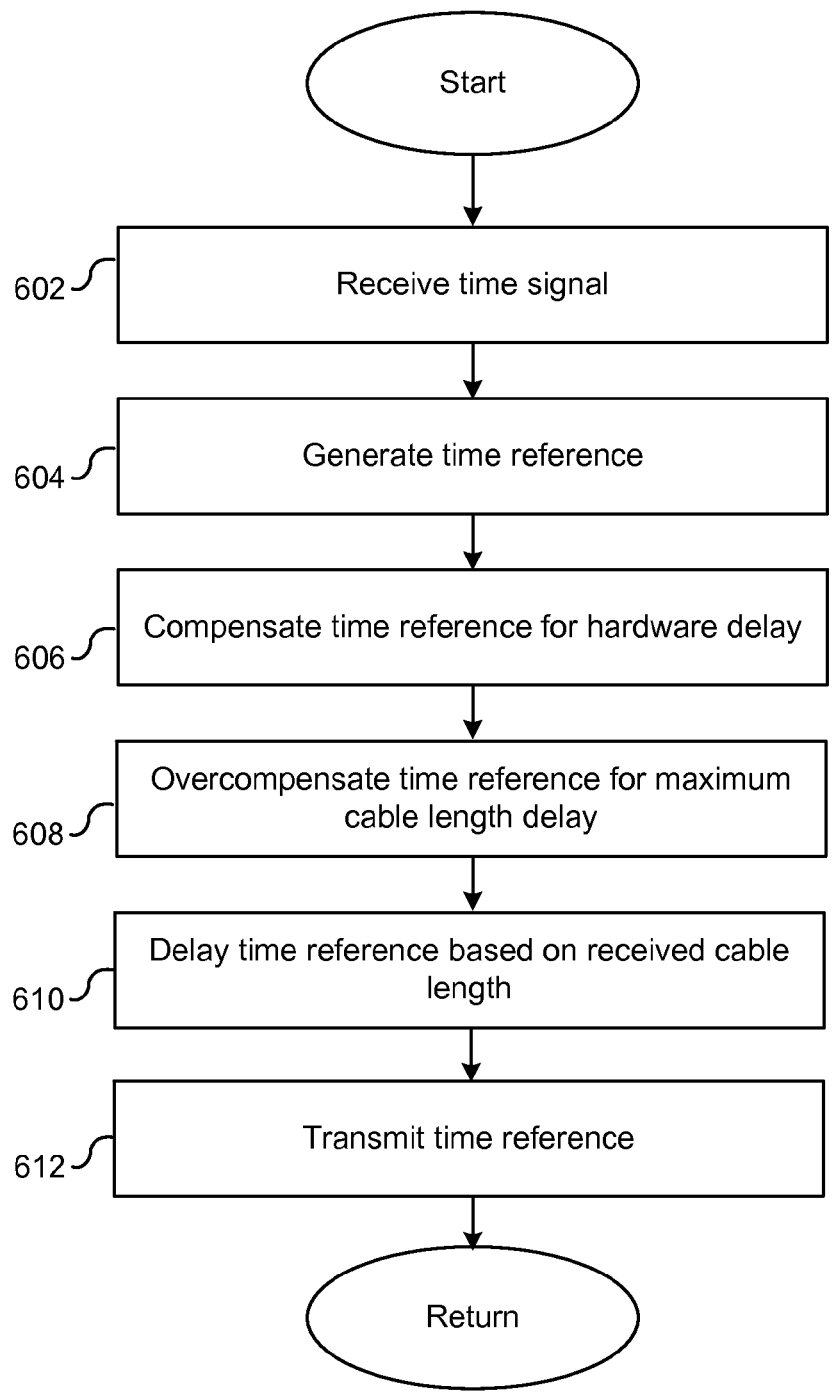
FIG. 6 is an example flow diagram illustrating a method for generating a synchronized time reference.

FIG. 6 is an example flow diagram illustrating a method for generating a synchronized time reference according to the techniques introduced here. At 602 the time distribution device 304 receives a time signal from one or more time sources. As described above, the time distribution device may receive a time signal via a WWVB receiver, a GNSS receiver, an external time source, a local time source, or other various time sources. At 604, the time reference generator 305 generates a time reference based on the received time signal. For example, the time reference generator may receive a GNSS pulse-per-second (PPS) signal and use a frequency synthesizer to generate a time reference matching the GNSS PPS.

At 606, the time reference generator compensates the time reference for hardware delay. The time reference generator may determine the amount of compensation for hardware delay based on a feedback signal that includes the hardware delay. For example, assuming that hardware in the time distribution device delays the time reference by 0.1 µs, the time reference generator would compensate the time reference by 0.1 µs to account for this delay. In addition to compensating for hardware delay of the time distribution device, at 608 the time reference generator overcompensates the time reference for a maximum cable length delay. For example, assume that a delay caused by an output cable is 5 ns/m and that a maximum allowed cable length for the system is 500 m. The maximum expected delay due to an output cable is therefore 2.5 µs. In this example, the time reference, which has already been compensated 0.1 µs for internal hardware delay, is overcompensated by and additional 2.5 µs to take into account this maximum cable length delay. Thus, at this point, the time reference is leading the time signal by 2.6 µs.

At 610, the time reference generator delays the overcompensated time reference based on a received cable length. A user may enter this cable length at a user interface on the time distribution device or at a remote location. Continuing with the present example, assume that a 100 m cable is connecting the time distribution device to an end device that is going to receive the synchronized time reference. The delay caused by a 100 m cable in this example would be 0.5 µs. Based on this received cable length, the time reference generator delays the overcompensated signal by the difference of the maximum cable length delay and the delay caused by the 100 m cable. Continuing with the example, the maximum cable length delay is 2.5 µs and the 100 m cable length delay is 0.5 µs. Therefore, the time reference generator would delay the overcompensated signal by 2.0 µs.

At 612 the time distribution device transmits the time reference to an end device. The techniques introduced here allow for multiple end devices, each having a different cable length, to receive a synchronized time reference.

Figure 7:
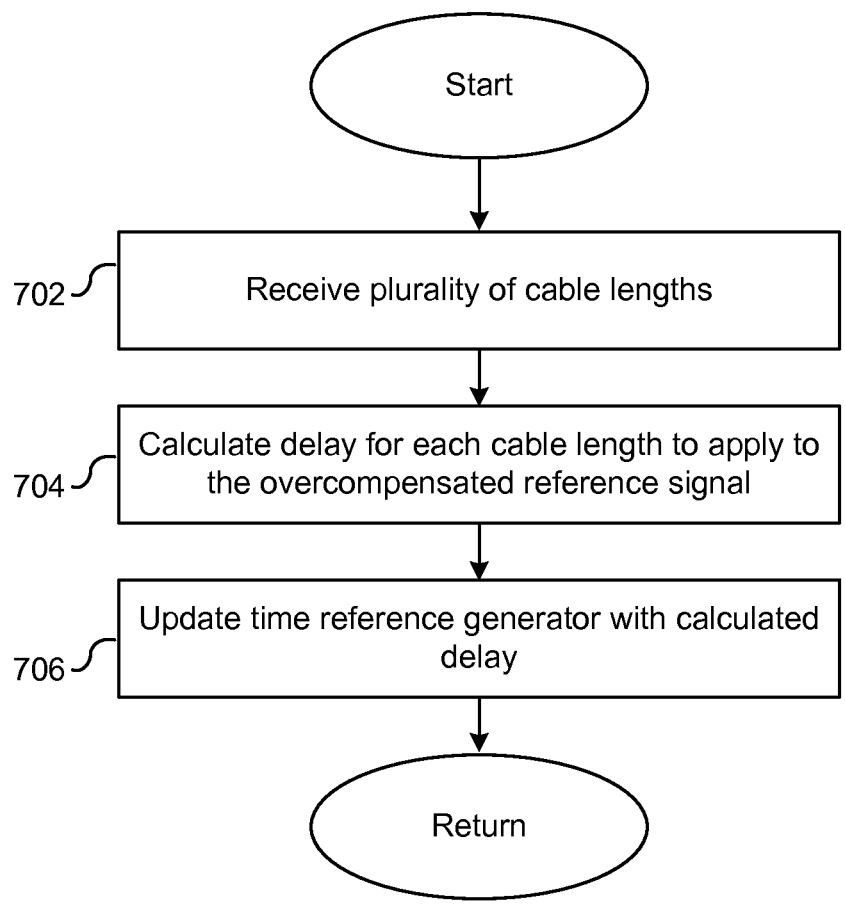
FIG. 7 is an example flow diagram illustrating a method for updating a time reference generator based on received cable lengths.

FIG. 7 is an example flow diagram illustrating a method for updating a time reference generator based on received cable lengths. At 702 the time distribution device receives one or more cable lengths through user input. At 704, a processing unit of the time distribution device, for example, may calculate a delay to apply to the overcompensated signal based on each of the received cable lengths. As described above with reference to FIG. 6, the cable length delay may be used by the processing unit of the time distribution device to calculate a delay by calculating the difference between the maximum delay by which the time reference was overcompensated and the delay caused by a respective cable length. At 706, the time distribution device updates the time reference generator with the calculated delay from 704.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A method comprising:
   receiving, at a time distribution device, a time signal;
   generating a time reference based on the received time signal;
   overcompensating the time reference for a hardware delay of the time distribution device and, for a maximum cable length delay, to produce an overcompensated time reference;
   for a first end device, adding a first delay to the overcompensated time reference based on a difference between the maximum cable length delay and a delay related to a cable length between the time distribution device and the first end device, to create a first end device time reference;
   for a second end device, adding a second delay to the overcompensated time reference based on a difference between the maximum cable length delay and a delay related to a cable length between the time distribution device and the second end device, to create a second end device time reference;
   transmitting the first end device time reference to the first end device, and,
   transmitting the second end device time reference to the second end device.

2. The method of 1, further comprising receiving the cable length between the time distribution device and the first end device and the cable length between the time distribution device and the second end device.

3. The method of claim 1, wherein generating the time reference is performed by a Field-Programmable Gate Array (FPGA).

4. The method of claim 3, wherein adding the first delay and the second delay to the overcompensated time reference is performed by a plurality of registers of the FPGA.

5. The method of claim 2, further comprising calculating the first delay based on the received cable length to the first end device and calculating the second delay based on the received cable length to the second device.

6. The method of claim 1, further comprising encoding a time data on the time reference.

7. The method of claim 1, wherein the maximum cable length comprises a maximum allowed cable length.

8. The method of claim 1, wherein the maximum cable length comprises the longer of the cable length between the time distribution device and the first end device and the cable length between the time distribution device and the second end device.

9. The method of claim 1, further comprising:
   for a third end device, adding a third delay to the overcompensated time reference based on a difference between the maximum cable length and a cable length between the time distribution device and the third end device, to create a third end device time reference; and,
   transmitting the third end device time reference to the third end device.

10. A time distribution device for receiving and distributing a synchronized time reference to a plurality of end devices, comprising:
    a receiver configured to receive a time signal;
    a time reference generator configured to
       generate a time reference based on the time signal;
       overcompensate the time reference for a hardware delay of the time distribution device and, for a maximum cable length delay to produce an overcompensated time reference; and
       for a first end device, add a first delay to the overcompensated time reference based on a difference between the maximum cable length delay and a delay related to a cable length between the time distribution device and the first end device to create a first end device time reference;
       for a second end device, add a second delay to the overcompensated time reference based on a difference between the maximum cable length delay and a delay related to a cable length between the time distribution device and the second end device to create a second end device time reference; and
    a transmitter configured to transmit the first end device time reference to the first end device and the second end device time reference to the second end device.

11. The time distribution device of claim 10, further comprising a user interface component configured to receive the cable length between the time distribution device and the first end device and the cable length between the time distribution device and the second end device.

12. The time distribution device of claim 10, wherein the time reference generation component comprises a Field-Programmable Gate Array (FPGA).

13. The time distribution device of claim 12, wherein the FPGA comprises a plurality of registers configured to add the first delay and the second delay to the overcompensated time reference.

14. The time distribution device of claim 13, further comprising a processing unit configured to update the plurality of registers based on the received cable length to the first end device and the received cable length to the second end device.

15. The time distribution device of claim 10, further comprising a time data encoder to encode a time data from the time signal on the time reference.

16. The time distribution device of claim 10, wherein the maximum cable length comprises a maximum allowed cable length.

17. The time distribution device of claim 10, wherein the maximum cable length comprises the longer of the cable length between the time distribution device and the first end device and the cable length between the time distribution device and the second end device.

18. The time distribution device of claim 10,
    wherein the time reference generator is further configured to add a third delay to the overcompensated time reference based on a difference between the maximum cable length and a cable length between the time distribution device and the third end device to create a third end device time reference for a third end device; and
    wherein the transmitter is further configured to transmit the third end device time reference to the third end device.

* * * * *